(12) United States Patent
Shinpo et al.

(10) Patent No.: US 9,863,304 B2
(45) Date of Patent: Jan. 9, 2018

(54) EXHAUST HEAT RECOVERY DEVICE (71) Applicant: TOYOTA JIDOSHA KABUSHIKI KAISHA, Toyota-shi, Aichi-ken (JP)

(72) Inventors: Yoshikazu Shinpo, Nisshin (JP); Yukihisa Matsuda, Nagoya (JP); Takato Ishihata, Takahama (JP); Toshio Murata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/712,571

(22) Filed: May 14, 2015

(65) Prior Publication Data
US 2015/0354438 A1 Dec. 10, 2015

(30) Foreign Application Priority Data

Jun. 5, 2014 (JP) ................. 2014-117057

(51) Int. Cl.
*F01P 11/10* (2006.01)
*F01N 5/02* (2006.01)
(Continued)

(52) U.S. Cl.
CPC ............. *F01P 11/10* (2013.01); *F01N 5/02* (2013.01); *F01N 9/00* (2013.01); *F02G 5/02* (2013.01); *F01N 2240/02* (2013.01); *F01N 2240/36* (2013.01); *F01N 2900/12* (2013.01); *F01N 2900/1628* (2013.01); *F28D 9/0043* (2013.01); *F28D 21/0003* (2013.01);
(Continued)

(58) Field of Classification Search
CPC .......... F01N 5/02; F01N 9/00; F01N 2240/02; F01N 2240/36; F01N 2900/12; F01N 2900/1628; F01P 11/10; F02G 5/02; Y02T 10/16; Y02T 10/166
USPC .................................................... 60/287, 320
See application file for complete search history.

(56) References Cited

U.S. PATENT DOCUMENTS

| 4,345,897 A | 8/1982 | Stanton |
| 6,018,949 A * | 2/2000 | Brosecke ............ F01N 3/2006 60/280 |

(Continued)

FOREIGN PATENT DOCUMENTS

| JP | S49-109036 U | 9/1974 |
| JP | S54-37917 A | 3/1979 |

(Continued)

OTHER PUBLICATIONS

Feb. 23, 2016 Japanese Office Action issued in Japanese Patent Application No. 2014-062478.
(Continued)

*Primary Examiner* — Mark Laurenzi
*Assistant Examiner* — Dapinder Singh
(74) *Attorney, Agent, or Firm* — Oliff PLC (57) ABSTRACT

An exhaust heat recovery device of the present invention has: a first pipe through which exhaust from an engine flows; a second pipe that branches-off from the first pipe, and at which is disposed a heat recovery apparatus that carries out heat exchange with the exhaust and recovers exhaust heat; a valve member that adjusts an amount of flow of the exhaust that flows-in from the first pipe to the second pipe; and plural driving members that drive the valve member.

5 Claims, 4 Drawing Sheets

(51) Int. Cl.
*F01N 3/02* (2006.01)
*F01N 3/10* (2006.01)
*F02G 5/02* (2006.01)
*F01N 9/00* (2006.01)
F28F 27/02 (2006.01)
F28D 9/00 (2006.01)
F28D 21/00 (2006.01)

(52) U.S. Cl.
CPC .............. *F28F 27/02* (2013.01); *Y02T 10/16* (2013.01); *Y02T 10/166* (2013.01); *Y02T 10/47* (2013.01)

(56) References Cited

U.S. PATENT DOCUMENTS

| | | | |
|---|---|---|---|
| 7,246,487 B2* | 7/2007 | Hara | B60H 1/025 60/285 |
| 2002/0104892 A1 | 8/2002 | Suda | |
| 2005/0202933 A1* | 9/2005 | Sorab | F16H 57/0413 477/161 |
| 2009/0173295 A1 | 7/2009 | Fishman et al. | |
| 2011/0189061 A1 | 8/2011 | Van Loyen et al. | |
| 2012/0222838 A1 | 9/2012 | Hisanaga et al. | |
| 2015/0275739 A1 | 10/2015 | Ishihata et al. | |

FOREIGN PATENT DOCUMENTS

| | | |
|---|---|---|
| JP | S56-161121 U | 12/1981 |
| JP | S60-61574 U | 4/1985 |
| JP | H05-196170 A | 8/1993 |
| JP | 2001-317355 A | 11/2001 |
| JP | 2006-161593 A | 6/2006 |
| JP | 2006-312884 A | 11/2006 |
| JP | 2007-100665 A | 4/2007 |
| JP | 2008-101481 A | 5/2008 |
| JP | 2010-144566 A | 7/2010 |
| JP | 2012-097587 A | 5/2012 |
| JP | 2012-102621 A | 5/2012 |
| JP | 2012-184681 A | 9/2012 |
| JP | 2015-183639 A | 10/2015 |

OTHER PUBLICATIONS

Jan. 4, 2016 Office Action issued in U.S. Appl. No. 14/663,904.
Oct. 4, 2016 Office Action issued in Japanese Patent Application No. 2014-117057.

* cited by examiner

EXHAUST HEAT RECOVERY DEVICE

CROSS-REFERENCE TO RELATED APPLICATION

This application claims priority under 35 USC 119 from Japanese Patent Application No. 2014-117057 filed Jun. 5, 2014, the disclosure of which is incorporated by reference herein.

BACKGROUND

Technical Field

The present invention relates to an exhaust heat recovery device.

Related Art

There is the technique of raising the temperature of engine cooling water or the like by using the heat of the exhaust from the engine of an automobile. For example, Japanese Patent Application Laid-Open (JP-A) No. 2007-100665 discloses, in an exhaust structure that returns some of the exhaust of the engine to the intake side, a structure that enables heat exchange between cooling water and the exhaust without circulating the exhaust to the intake passage, by opening an opening/closing valve of a bypass passage even at times when the temperature of the engine is low.

Further, JP-A No. 2006-312884 discloses an exhaust heat recovery device that has a heat exchange path having a heat exchanger, and a bypass path that bypasses the heat exchanger. The flow path of the exhaust is switched by controlling a valve body that is provided at the bypass path.

When the flow path of exhaust is switched by control of a valve body (an opening/closing valve) as in JP-A No. 2007-100665 and JP-A No. 2006-312884, there is the need to sufficiently consider the durability of the actuator and the like that drive the valve body by repeating driving of the valve body, and accordingly, the durability of the exhaust heat recovery device.

SUMMARY

In consideration of the above-described circumstances, the present invention provides an exhaust heat recovery device that has improved durability.

An exhaust heat recovery device of a first aspect of the present invention has: a first pipe through which exhaust from an engine flows; a second pipe that branches-off from the first pipe, and at which is disposed a heat recovery apparatus that carries out heat exchange with the exhaust and recovers exhaust heat; a valve member that adjusts an amount of flow of the exhaust that flows-in from the first pipe to the second pipe; and plural driving members that drive the valve member.

In this exhaust heat recovery device, the amount of flow of the exhaust from the engine that flows-in from the first pipe to the second pipe is adjusted due to the driving members driving the valve member. The heat recovery apparatus that carries out heat exchange with the exhaust heat is disposed at the second pipe. By increasing and decreasing the amount of flow of exhaust to the second pipe, the amount of heat exchanged by the heat recovery apparatus can be increased and decreased.

In this exhaust heat recovery device, because the valve member is driven by plural driving members, the burden (e.g., the number of times of driving or the driving load) on each individual driving member is reduced and the durability of the exhaust heat recovery device can be improved, as compared with a case in which the valve member is driven by a single driving member.

In an exhaust heat recovery device of a second aspect of the present invention, in the first aspect of the present invention, the plural driving members include a first driving member that drives the valve member on the basis of changes in temperature of a heat medium of the heat recovery apparatus.

In this exhaust heat recovery device, the plural driving members include a first driving member that can drive the valve member on the basis of changes in the temperature of the heat medium (e.g., engine cooling water). Therefore, the effect of raising the temperature of the heat medium can be strengthened or lessened on the basis of the temperature of the heat medium. Further, energization for driving the valve member can be rendered unnecessary or decreased. Namely, the amount of consumed power that is needed to drive the valve member can be reduced (the fuel efficiency of the vehicle can be improved).

In an exhaust heat recovery device of a third aspect of the present invention, in the first aspect of the present invention, the plural driving members include a second driving member that drives the valve member on the basis of changes in atmospheric temperature of the first pipe.

In this exhaust heat recovery device, the plural driving members include a second driving member that drives the valve member on the basis of changes in the atmospheric temperature of the first pipe. Accordingly, for example, if there is the possibility that moisture within the exhaust will freeze at a downstream region of the first pipe due to a drop in the outside air temperature, due to the second driving member driving the valve member and reducing the amount of flow of exhaust to the second pipe, high-temperature exhaust gas flows to the downstream side of the first pipe, and freezing of the moisture, that is within the exhaust, at the interior of the first pipe can be prevented or suppressed.

In an exhaust heat recovery device of a fourth aspect of the present invention, in the first aspect of the present invention, the plural driving members include a first driving member that drives the valve member on the basis of changes in temperature of a heat medium of the heat recovery apparatus, and a second driving member that drives the valve member on the basis of changes in atmospheric temperature of the first pipe, and, on the basis of changes in the atmospheric temperature of the first pipe, the second driving member drives the valve member and reduces an amount of flow of the exhaust with respect to the second pipe, regardless of a state of driving of the first driving member.

In this exhaust heat recovery device, the plural driving members include a second driving member that, on the basis of changes in the atmospheric temperature of the first pipe, drives the valve member and reduces the amount of flow of the exhaust with respect to the second pipe, regardless of the state of driving of the first driving member. Accordingly, for example, if there is the possibility that moisture within the exhaust will freeze in a downstream region of the first pipe due to a drop in the atmospheric temperature (outside air temperature), the valve member is driven and the amount of flow of the exhaust to the second pipe is reduced, regardless of the temperature of the heat medium. As a result, the amount of flow of the high-temperature exhaust, that has not been involved in heat exchange at the heat recovery apparatus of the second pipe, is increased at the downstream region of the first pipe. Due thereto, freezing of the moisture, that is within the exhaust, in the first pipe can be prevented or suppressed.

In an exhaust heat recovery device of a fifth aspect of the present invention, in the first aspect of the present invention, the plural driving members include a third driving member that drives the valve member by energization, and the third driving member drives the valve member by energization and reduces an amount of flow of the exhaust with respect to the second pipe, regardless of states of driving of the other driving members.

In this exhaust heat recovery device, the third driving member drives the valve member on the basis of energization, regardless of the states of driving of the other driving members. Therefore, the heat recovery amount of the heat medium can be changed at an arbitrary timing by driving (opening or closing) the valve member.

For example, by combining the first driving member and the second driving member of any one of the second through fourth aspects of the present invention and the third driving member of the fifth aspect of the present invention, at times of usual control, the control for opening and closing the valve member is carried out by the first driving member and the second driving member on the basis of changes in the temperature of the heat medium or the atmospheric temperature, and the control for opening and closing the valve member can be carried out by the third driving member only when it is desired to open or close the valve member at an arbitrary timing. Due thereto, opening and closing of the valve member can be carried out at an arbitrary timing, while the amount of power that is consumed is suppressed.

In an exhaust heat recovery device of a sixth aspect of the present invention, in the first aspect of the present invention, at least one driving member among the plural driving members is driven at different timings than others of the driving members.

In this exhaust heat recovery device, for example, even if a plurality of the same type of driving member are used, the driving timings of at least one driving member and others of the driving members differ. Therefore, differently than in a case in which driving is carried out at the same timing, the burden (the number of times of driving) of each individual driving member is reduced, and the durability improves.

BRIEF DESCRIPTION OF THE DRAWINGS

Exemplary embodiments of the present invention will be described in detail based on the following figures, wherein.

DETAILED DESCRIPTION

First Embodiment

Figure 1:
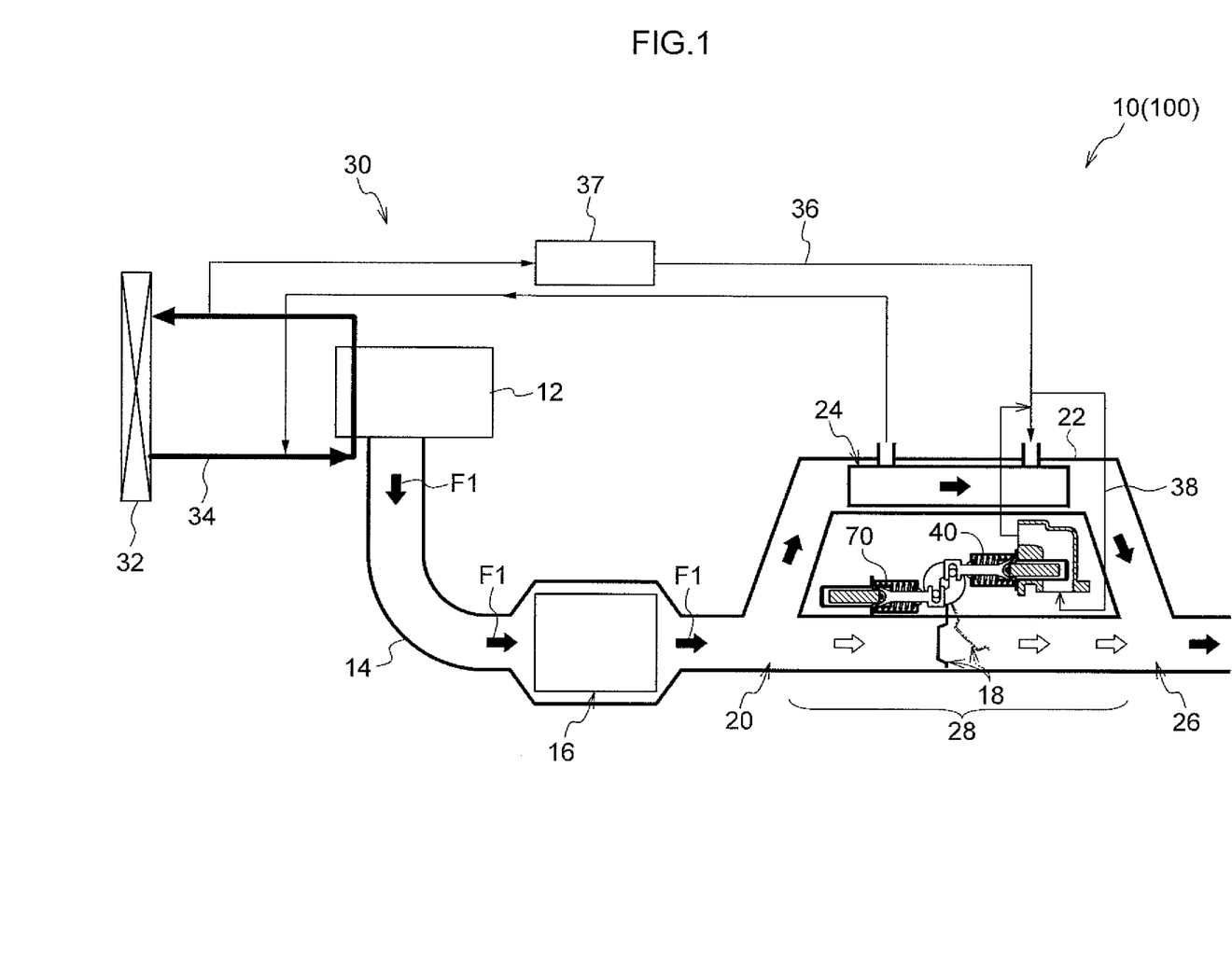
FIG. 1 is an overall schematic structural drawing showing an exhaust heat recovery device of a first embodiment of the present invention.

An exhaust heat recovery device relating to a first embodiment of the present invention is described with reference to FIG. 1 and FIG. 2.

The overall structure of an exhaust heat recovery device 10 is described with reference to FIG. 1.

First, the exhaust circuit from an engine 12 is described. As shown in FIG. 1, a catalytic converter 16, that removes specific components within the exhaust, and a valve member 18, that adjusts the amount of exhaust flowing to a second pipe 22 that is described later, are provided in that order toward the downstream side at a first pipe 14 that is provided at the downstream side of the engine 12.

Further, a heat recovery apparatus 24, that recovers the heat of the exhaust and raises the temperature of engine cooling water, is provided at the second pipe 22 that branches-off from the first point 14 at a branch point 20 that is at the downstream side of the catalytic converter 16 of the first pipe 14. The second pipe 22 merges with the first pipe 14 again at merging point 26 that is at the downstream side of the heat recovery apparatus 24.

Accordingly, of the first pipe 14, the region from the branch point 20 to the merging point 26 is a bypass flow path 28 that bypasses the second pipe 22 at which the heat recovery apparatus 24 is provided.

When merely "upstream" and "downstream" are used hereinafter, they mean the "upstream" and the "downstream" in the direction of flow of the exhaust (the arrow F1 direction).

A circulating circuit 30 of cooling water of the engine 12 is described next.

The circulating circuit 30 has a circulating pipe 34, that circulates cooling water between the engine 12 and a radiator 32, and a recovery pipe 36, that leads some of the cooling water from along the route of the circulating pipe 34 to the heat recovery apparatus 24 and returns cooling water to the circulating pipe 34.

The recovery pipe 36 is structured so as to branch-off from the engine downstream side of the circulating pipe 34, and cause some of the cooling water to flow therein, and return cooling water to the upstream side of the circulating pipe 34. Note that, in the present embodiment, a heater 37 that heats the cooling water as needed is provide at the recovery pipe 36.

Further, a supply pipe 38, that branches-off at the upstream side of the heat recovery apparatus 24, and supplies some of the cooling water to a first actuator 40 that is described later, and returns cooling water to the upstream side of the heat recovery apparatus 24, is provided at the recovery pipe 36.

The valve member 18 is described next.

The valve member 18 is provided at the bypass flow path 28 at the first pipe 14. The valve member 18 is controlled by the first actuator 40 and a second actuator 70 that are described later, and moves between a closing position that is shown by the solid line, and an opening position that is shown by the two-dot chain line, in FIG. 1 and FIG. 2. At the closing position, the valve member 18 makes the flow path sectional area of the bypass flow path 28 small (however, does not have to completely close-off the bypass flow path 28), and therefore, the amount of flow of the exhaust that flows to the second pipe 22 increases. In contrast, at the opening position, the valve member 18 increases the flow path sectional area of the bypass flow path 28 more than when the valve member 18 is at the closing position, and therefore, the amount of flow of the exhaust that flows to the second pipe 22 decreases.

The structure of the first actuator 40 is described next with reference to FIG. 2.

The first actuator 40 has a housing main body 46 that has a first housing 42 and a second housing 44. The first housing 42 is shaped as a cylindrical tube having a tube portion 42A and a bottom portion 42B. The second housing 44 also is shaped as a cylindrical tube having a tube portion 44A and a bottom portion 44B. The housing main body 46, whose overall outer shape is substantially cylindrical tube shaped, is structured due to flange portions 42F, 44F of the first housing 42 and the second housing 44 being joined together.

Note that an insert-through hole 43, for the advancing and withdrawing of a rod 52 that is described later, is formed in the bottom portion 42B of the first housing 42.

The bottom portion 44B side of the second housing 44 is disposed so as to project-out into a conduit 45 that structures a portion of the supply path 38 of the cooling water. Note that the conduit 45 is a structure in which the cooling water flows from the lower side to the upper side in FIG. 2.

The interior of the housing main body 46 is divided by an elastic partitioning wall 47 into first space 48 at the first housing 42 side and a second space 50 at the second housing 44 side. The rod 52 that can advance and withdraw from the insert-through hole 43 is accommodated in the first space 48.

A converting disc 56 that rotates around a supporting shaft 55 is disposed at the distal end of the rod 52. A holding portion 54 is provided at one end of the rod 52. A holding pin 58 of the converting disc 56 is accommodated within a recess 57 that is provided in the holding portion 54. Accordingly, due to the rod 52 moving forward and rearward, the converting disc 56 rotates around the supporting shaft 55.

One end 18A side (the upper side in FIG. 2) of the valve member 18 is fixed to the converting disc 56. When the rod 52 moves (advances-out) in the arrow M1 direction, the converting disc 56 rotates in the arrow R1 direction, and the valve member 18 rotates in the arrow B1 direction and moves toward the opening position. In contrast, when the rod 52 moves (retreats rearward) in the arrow M2 direction, the converting disc 56 rotates in the arrow R2 direction, and the valve member 18 rotates in the arrow B2 direction and moves toward the closing position. Namely, the converting disc 56 converts the rectilinear motion of the rod 52 into rotational motion (rotation) of the valve member 18.

A bracket 60 is mounted to the other end of the rod 52. A spring 62 is accommodated between the bracket 60 and the bottom portion 42B of the first housing 42. Via the bracket 60, the spring 62 urges the rod 52 in the arrow M2 direction (the direction of retreating rearward into the first housing 42).

In the second space 50 of the first actuator 40, a moving pin 64 is accommodated and wax 66 is filled. One end of the moving pin 64 is fixed to the elastic partitioning wall 47. The wax 66 is a liquid member having a predetermined viscosity, and the volume thereof increases due to a rise in temperature caused by heating. The elastic partitioning wall 47 permits such changes in the volume of the wax 66, and suppresses leaking-out of the wax 66 from the second space 50.

Further, when the volume of the wax 66 increases, the elastic partitioning wall 47 extends slightly, and the volume of the second space 50 increases, and the moving pin 64 moves in the arrow M1 direction. As a result, the moving pin 64 urges the rod 52 in the arrow M1 direction via the elastic partitioning wall 47.

In contrast, when the volume of the wax 66 decreases, the elastic partitioning wall 47 contracts slightly, and the volume of the second space 50 decreases, and the moving pin 64 moves in the arrow M2 direction. Because the moving pin 64 no longer urges the rod 52, the rod 52 moves in the arrow M2 direction due to the urging force of the spring 62.

Because the bottom portion 44B side of the second housing 44 is exposed at the conduit 45 that structures a portion of the supply pipe 38 of the cooling water, there is a structure in which the volume of the wax 66 increases and decreases and the valve member 18 opens and closes in accordance with changes in the temperature of the cooling water.

Namely, when the temperature of the cooling water is higher than a target cooling water temperature, the wax 66 expands, and the rod 52 that is pushed by the elastic partitioning wall 47 is urged in the arrow M1 direction, and the converting disc 56 is urged in the arrow R1 direction. On the other hand, when the temperature of the cooling water is lower than the target cooling water temperature, the wax 66 does not expand, or the wax 66 that has expanded contracts, and, without the elastic partitioning wall 47 pushing the rod 52, the rod 52 is urged in the arrow M2 direction by the urging force of the spring 62, and the converting disc 56 is urged in the arrow R2 direction. The wax 66 that works in this way in accordance with the temperature of the cooling water is selected.

The structure of the second actuator 70 is described next. Structural elements that are similar to those of the first actuator are denoted by the same reference numerals, and description thereof is omitted. Accordingly, only portions that differ from the first actuator 40 are described.

Figure 2:
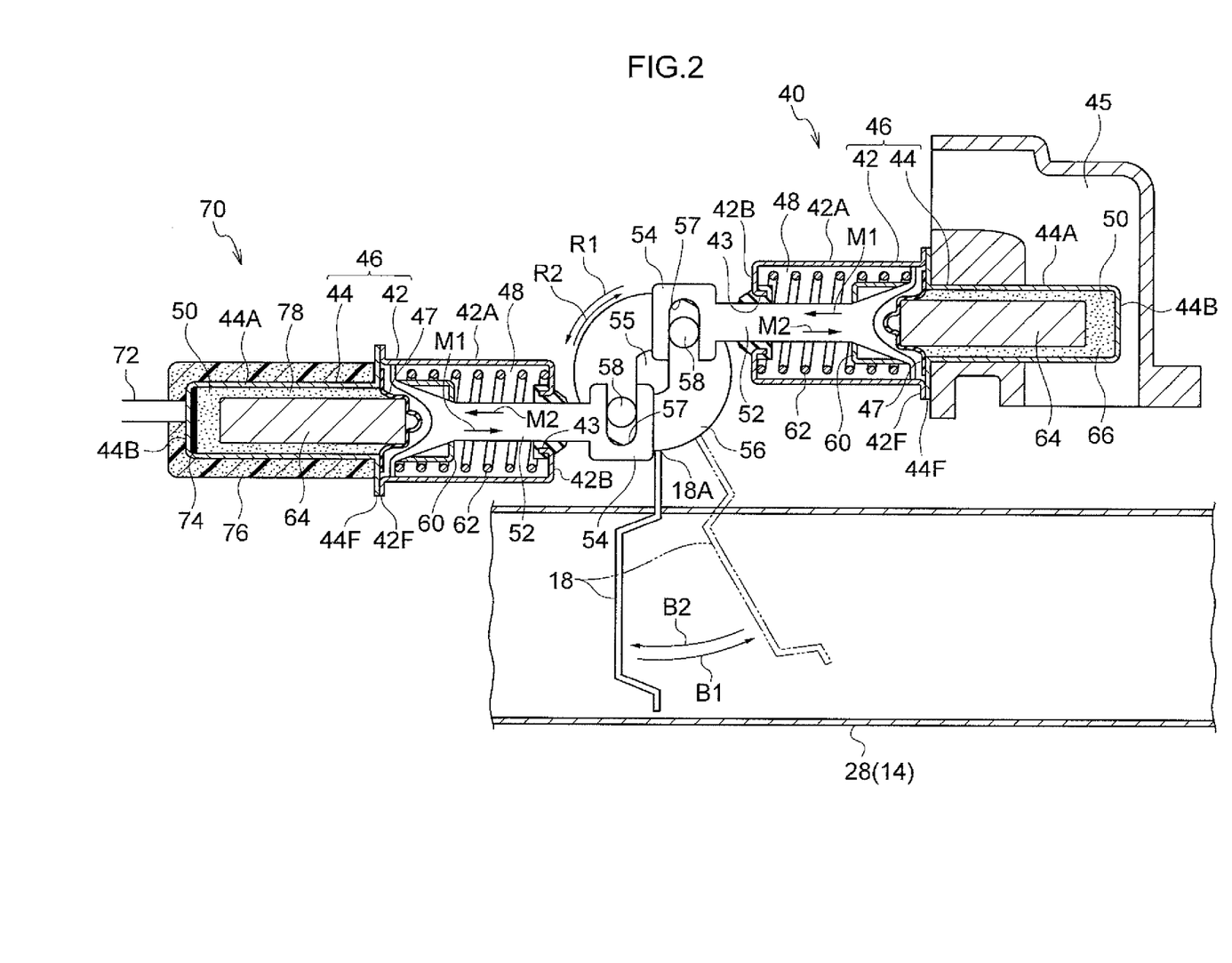
FIG. 2 is a cross-sectional view showing a driving device of the exhaust heat recovery device of the first embodiment of the present invention.

As shown in FIG. 2, in the second space 50 of the second actuator 70, the moving pin 64 is accommodated, and wax 78, that expands due to heating caused by energization, is filled. Further, a heat-generating body 74, that generates heat when energized from a lead wire 72 for energization, is accommodated in the second space 50.

Further, a heat insulating member 76 is disposed at the outer sides of the tube portion 44A and the bottom portion 44B of the second housing 44. The heat insulating member 76 covers substantially the entire range of the tube portion 44A and the entire range of the bottom portion 44B. The heat insulating member 76 is formed from, for example, a porous resin material, and provides heat insulation between the interior (the wax 78) and the exterior of the second space 50.

Operation of the present embodiment is described next.

When the temperature of the cooling water that flows to the supply pipe 38 is higher than the target cooling water temperature, the volume of the wax 66, that is accommodated within the second housing 44 of the first actuator 40 that is disposed so as to project-out into the conduit 45 that structures a portion of the supply pipe 38, increases. As a result, the moving pin 64 moves in the arrow M1 direction, and, via the elastic partitioning wall 47, urges the rod 52 in the arrow M1 direction. Because this urging force is greater than the urging force of the spring 62, urging force in the arrow R1 direction is applied to the converting disc 56 from the rod 52.

At this time, because the second actuator 70 is usually not energized, the rod 52 is urged in the arrow M2 direction by the urging force of the spring 62, and urges the converting disc 56 in the arrow R2 direction.

Here, the urging force, that is applied to the converting disc 56 from the first actuator 40, is greater than the urging force that is applied to the converting disc 56 from the second actuator 70. Accordingly, the rods 52 of the first actuator 40 and the second actuator 70 respectively move in the arrow M1 directions against the urging forces of the springs 62, and rotate the converting disc 56 in the arrow R1 direction. As a result, the valve member 18 rotates in the arrow B1 direction, and is set at the opening position.

In the state in which the valve member 18 is at the opening position, the flow path sectional area of the bypass flow path 28 of the first pipe 14 increases. Therefore, the amount of flow of the exhaust that flows to the bypass flow path 28 increases, and the amount of flow of the exhaust that flows through the second pipe 22 decreases. Accordingly, the effect of raising the temperature of the engine cooling water by the heat recovery apparatus 24 can be suppressed.

On the other hand, when the temperature of the cooling water that flows to the supply pipe 38 is lower than the target cooling water temperature, the volume of the wax 66, that is accommodated within the second housing 44 of the first actuator 40 that is disposed so as to project-out into the conduit 45, decreases (does not expand). Therefore, the moving pin 64 does not urge the rod 52 in the arrow M1 direction. As a result, the rod 52 receives the urging force of the spring 62 and is urged in the arrow M2 direction, and urges the converting disc 56 in the arrow R2 direction.

At this time as well, the second actuator 70 is not driven, but the rod 52 is urged in the arrow M2 direction by the urging force of the spring 62 of the second actuator 70, and urges the converting disc 56 in the arrow R2 direction.

Accordingly, the converting disc 56 rotates in the arrow R2 direction, and the valve member 18 rotates in the arrow B2 direction and is set at the closing position.

In the state in which the valve member 18 is at the closing position, the flow path sectional area of the bypass flow path 28 of the first pipe 14 decreases, and therefore, the amount of flow of the exhaust that flows through the second pipe 22 increases. As a result, the effect of raising the temperature of the engine cooling water at the heat recovery apparatus 24 increases.

On the other hand, in a case in which the temperature of the cooling water is not to be raised (heat recovery is not to be carried out) at an arbitrary timing, such a situation can be handled by energizing the second actuator 70.

Namely, due to the driver of the vehicle manually operating an energization switch or the like, the heat generating body 74 of the second actuator 70 is energized, and the heat generating body 74 generates heat. As a result, the wax 78 expands and urges the rod 52 in the arrow M1 direction.

Note that the expansion force of the wax 78 of the second actuator 70 is greater than the urging forces of the springs 62 of the first actuator 40 and the second actuator 70. Accordingly, when the second actuator 70 is energized, even if the rod 52 of the first actuator 40 is in a state of being urged in the arrow M2 direction, the rod 52 of the first actuator 40 moves so as to follow the rod 52 of the second actuator 70. Namely, when the second actuator 70 is energized, the converting disc 56 rotates in the arrow R1 direction.

As a result, the valve member 18 rotates in the arrow B1 direction, and is set in the opening state. Accordingly, the amount of flow of the exhaust that flows through the bypass flow path 28 increases, and the amount of flow of the second pipe 22 decreases. As a result, raising of the temperature of the cooling water by the heat recovery apparatus 24 is suppressed.

On the other hand, in a case in which the rod 52 of the first actuator 40 is urged in the arrow M1 direction, the rod 52 of the second actuator 70 already moves (projects-out) in the arrow M1 direction. When the second actuator 70 is energized in this state, due to the movement of the moving pin 64 that is due to expansion of the wax 78 of the second actuator 70, the elastic partitioning wall 47 abuts the rod 52, and the rod 52 is urged in the arrow M1 direction (the rod 52 of the second actuator 70 does not move). Namely, the opening state of the valve member 18 is maintained.

In this way, when the second actuator 70 is energized, regardless of the state of driving of the first actuator 40, the valve member 18 is in the opening state, and there is a state in which the amount of flow of the exhaust that flows through the second pipe 22 is decreased.

Note that, in the present embodiment, "decreasing" the amount of flow of the exhaust of the second pipe 22 includes not only cases in which the amount of flow of the exhaust of the second pipe 22 is decreased by changing the valve member 18 from the opening position to the closing position, but also cases in which the state, in which the amount of flow of the exhaust of the second pipe 22 has been decreased, is maintained by maintaining the closing position of the valve member 18 when the second actuator 70 is energized.

Further, "decreasing" the amount of flow of the exhaust of the second pipe 22 includes cases in which the amount of flow of the exhaust of the second pipe 22 is made to be 0.

On the other hand, when the energizing of the second actuator 70 is stopped, the generating of heat by the heat generating body 74 stops, and the wax 78 contracts. As a result, if the wax 66 of the first actuator 40 is not expanded, the rod 52 moves in the arrow M2 direction due to the urging force of the spring 62, and the converting disc 56 rotates in the arrow R2 direction, and the valve member 18 is set at the closing position.

Note that the swelling force of each of the waxes 66, 78 of the first actuator 40 and the second actuator 70 is greater than the sum of the urging forces of the springs 62 of the first actuator 40 and the second actuator 70. Accordingly, if either of the actuators is driven, the valve member 18 is set at the opening position. Conversely, the valve member 18 is set at the closing position only when the first actuator 40 and the second actuator 70 are not driven.

In this way, the exhaust heat recovery device 10 relating to the present embodiment is structured so as to control the opening and closing of the valve member 18 by rotating the converting disc 56 by the first actuator 40 and the second actuator 70. Accordingly, as compared with a case in which the opening and closing of the valve member 18 are controlled by the converting disc 56 being rotated by a single actuator, the number of times that the first actuator 40 and the second actuator 70 are driven is reduced. As a result, for example, the number of times that the elastic partitioning walls 47 of the first actuator 40 and the second actuator 70 are displaced, and the like, is reduced, and the durability of the first actuator 40 and the second actuator 70 improves. Namely, the durability of the exhaust heat recovery device 10 can be improved.

Further, the usual control for opening and closing the valve member 18 is carried out by the first actuator 40, i.e., is driven by the expansion and contraction of the wax 66 that is based on the temperature of the cooling water. Therefore, energization is not needed for the usual control for opening and closing the valve member 18, and power consumption is reduced, and the fuel efficiency of the vehicle can be improved.

On the other hand, because the second actuator 70 can be driven by being energized, the valve member 18 can be set at the opening position by energizing the second actuator 70 at an arbitrary timing, regardless of the temperature of the cooling water. Namely, the bypass flow path 28 can be opened at an arbitrary timing, and high-temperature exhaust can be made to flow to the downstream side without engaging in heat exchange.

In this way, because control of the opening and closing of the valve member 18 is carried out by the first actuator 40 and the second actuator 70, control can be carried out to set the valve member 18 at the opening position at an arbitrary timing, while reducing power consumption.

In the state in which the valve member 18 is at the opening position, as compared with a case in which the valve member 18 is at the closing position, the flow path sectional area of the bypass flow path 28 of the first pipe 14 is enlarged, and therefore, the amount of flow of the exhaust to the second pipe 22 decreases. Therefore, at the heat recovery apparatus 24, the effect of raising the temperature of the engine cooling water is suppressed. Namely, by energizing the second actuator 70, raising of the temperature of the engine cooling water can be suppressed.

In this way, in the present embodiment, regardless of the temperature of the engine cooling water, the energizing/non-energizing of the second actuator 70 can be switched under an arbitrary condition, and strengthening/lessening of the effect of raising the temperature of the engine cooling water can be switched.

Further, in the present embodiment, the second actuator 70 has the heat insulating member 76. Because the wax 78 is insulated from the exterior by the heat insulating member 76, effects of external heat on the changing of the volume of the wax 78 are reduced. For example, the effects of heat from the first pipe 14, the second pipe 22, the heat recovery apparatus 24 and the like are reduced.

Moreover, at the second actuator 70, the temperature of the wax 78 is maintained by the heat insulating member 76. Therefore, the power consumption at the time when the second actuator 70 is energized and the volume of the wax 78 is increased can be reduced.

The heat medium is not limited to engine cooling water, and fluids, such as liquids or gasses or the like that are used in heat exchange, can be widely applied. Further, at the exhaust heat recovery device 10 of the present embodiment, the exhaust heat acts on the heat medium, and the temperature of the heat medium can be raised.

The first actuator 40 and the second actuator 70 are structures in which the waxes 66, 78 are sealed in the closed spaces (the second spaces 50) within the housing main bodies 46, and the moving pins 64 are moved by the expansion of the waxes 66, 78 due to heating. Because the changes in volumes of the waxes 66, 78 (liquids) are used as the driving force of the valve member 18 in this way, a large driving force is obtained as compared with, for example, a structure using a motor, or a structure in which driving force is obtained by changes in the volume of a gas within a closed space (a so-called negative pressure actuator).

Further, even if a large force in the valve opening direction (the arrow B1 direction in FIG. 2) is applied to the valve member 18 from the exhaust, it is possible to rotate the valve member 18 in the valve closing direction (the arrow B2 direction in FIG. 2) or to maintain the valve member 18 at the closing position against this force, and the degrees of freedom in the shape and the placement of the valve member 18 are high. A so-called swing valve, at which the center of rotation is set at the end portion (the supporting shaft 55) of the valve member 18 such as shown in FIG. 2, can be employed as the structure of the valve member 18. Of course, in the present embodiment, a so-called butterfly valve, at which the center of rotation is set at the center of the valve member 18, can also be employed.

Note that, in the exhaust heat recovery device 10 of the present embodiment, the first actuator 40, that is a non-controlled type in which the wax 66 expands and contracts in accordance with the temperature of the cooling water, and the second actuator 70, that is a controlled type in which the wax 78 expands and contracts by energization, are used in combination. However, the present invention is not limited to this combination.

For example, two of the controlled type second actuators 70 that are driven by being energized may be used in combination, or two non-controlled type actuators such as the first actuator 40 may be used in combination.

In this way, even in an exhaust heat recovery device in which a plurality of the exact same actuators are used in combination, by driving a valve member by the plural actuators, the driving load of each actuator is reduced, and the durability of the exhaust heat recovery device can be improved. Further, by driving at least one actuator and other actuators at different timings, the number of times that each actuator is driven is reduced, and the durability of the exhaust heat recovery device can be improved.

Here, "different timings" means that the timings of driving at least one actuator(s) and the other actuators are not exactly the same. Further, this "different timings" includes cases in which at least one actuator(s) is/are driven usually, and, if there is trouble with the actuator(s), the other actuators are driven, i.e., the other actuators are provided as back-up.

Further, although description has been given of using two actuators in combination in the exhaust heat recovery device 10 of the present embodiment, three or more actuators may be used in combination.

Second Embodiment

An exhaust heat recovery device relating to a second embodiment of the present invention is described. Structural elements that are similar to those of the first embodiment are denoted by reference numerals to which 100 is added to the reference numerals of the first embodiment, and detailed description thereof is omitted. Note that an exhaust heat recovery device 100 of the present embodiment corresponds to a structure in which two non-controlled type actuators are employed in combination.

Figure 3:
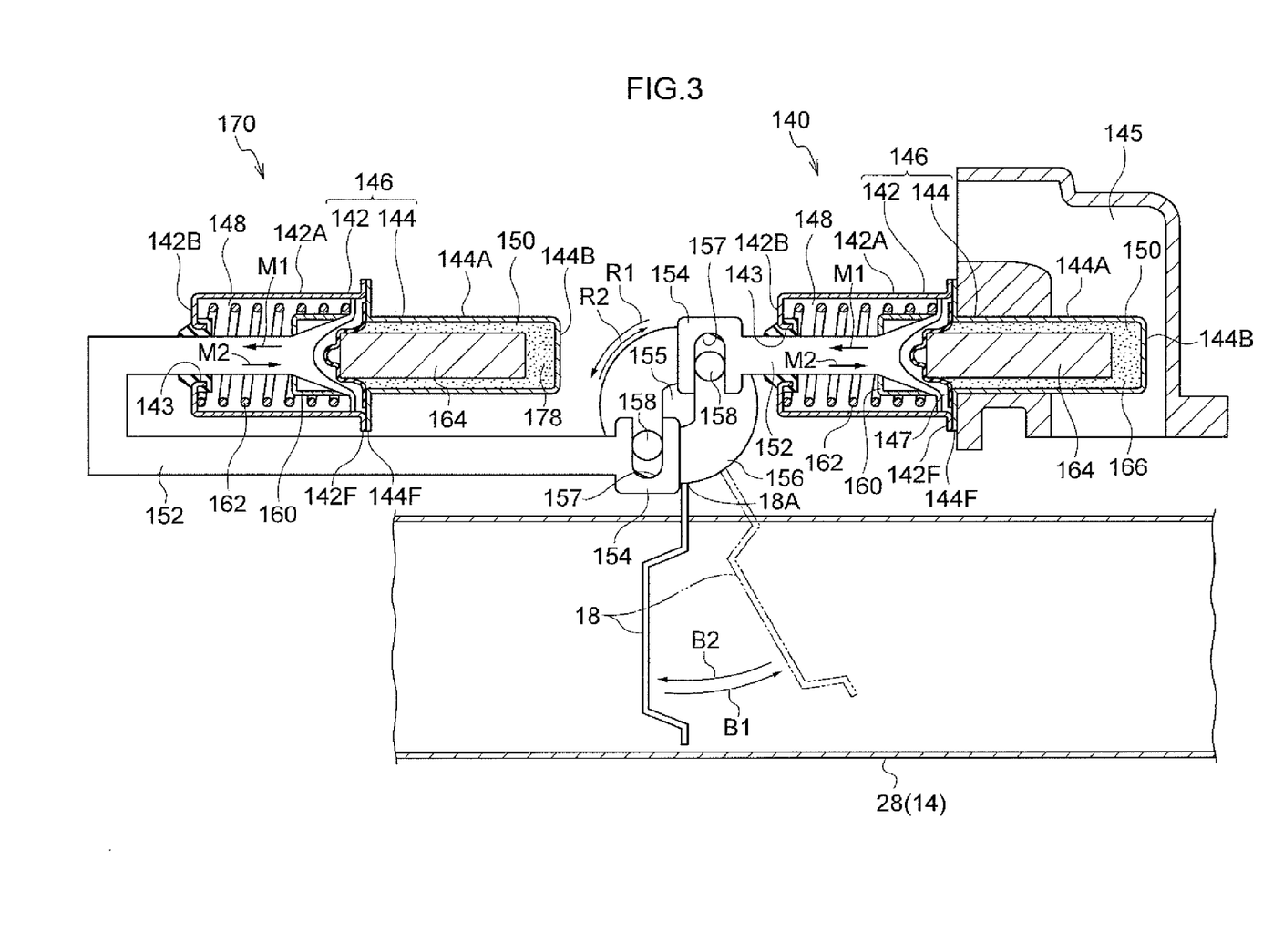
FIG. 3 is a cross-sectional view showing a driving device of an exhaust heat recovery device of a second embodiment of the present invention.

As shown in FIG. 3, because the structure of a first actuator 140 is exactly the same as that of the first actuator 40 of the first embodiment, description thereof is omitted.

The structure of a third actuator 170 is similar to the structure of the first actuator 140. However, a second housing 144 is exposed to the atmospheric air (the atmosphere), and wax 178, that is accommodated within the second housing 144, expands when the atmospheric temperature is greater than or equal to 0° C.

A rod 152 is a substantially U-shaped structure as seen in a vehicle side view. Accordingly, when the wax 178 expands and the rod 152 is urged in the arrow M1 direction, the force thereof is applied to a converting disc 156 as urging force in the arrow R2 direction. On the other hand, when expansion of the wax 178 ends, the converting disc 156 is urged in the arrow R1 direction by the urging force of a spring 162.

Figure 4:
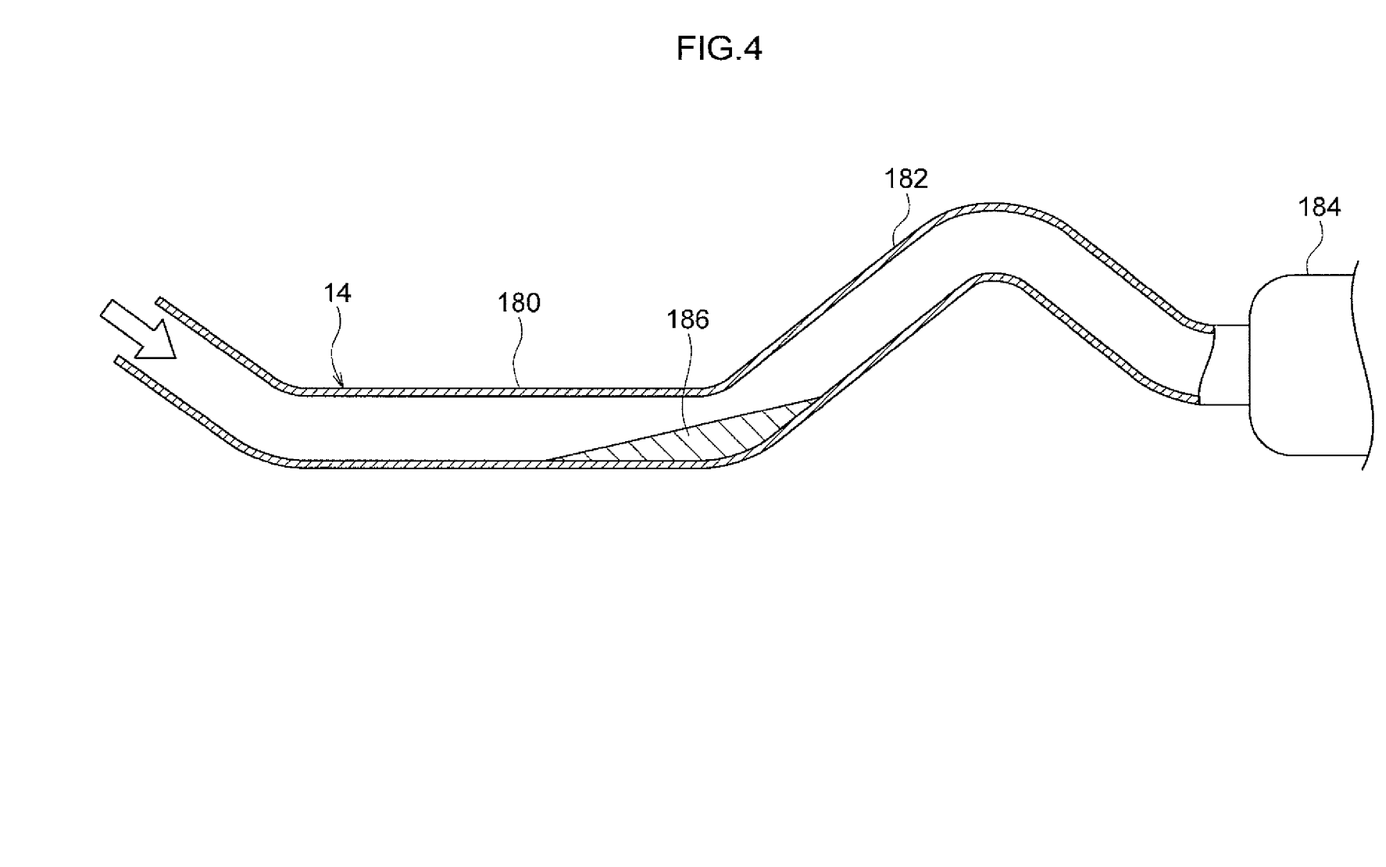
FIG. 4 is a cross-sectional view showing the downstream side of an exhaust system of the exhaust heat recovery device of the second embodiment of the present invention.

The structures that are further downstream than the merging point 26 of the first pipe 14 in the exhaust heat recovery device 100 are described next.

As shown in FIG. 4, a lowest portion 180 that is disposed beneath the floor panel of the vehicle and is disposed at the lowest position of the first pipe 14, a kick-up portion 182 that is bent upward in order to avoid a rear suspension at the vehicle rear side of the lowest portion 180, and a muffler 184 that is disposed at the rear of the kick-up portion 182, are provided further downstream than the merging point 26 of the first pipe 14.

Operation of the exhaust heat recovery device 100 that is structured in this way is described.

When the atmospheric (atmospheric air) temperature is greater than or equal to 0° C., the wax 178 of the third actuator 170 expands. Accordingly, the rod 152 of the third actuator 170 is urged in the arrow M1 direction, and urges the converting disc 156 in the arrow R2 direction.

At this time, urging forces in different directions are applied to the converting disc 156 from the first actuator 140, in accordance with whether or not the cooling water has reached the target cooling temperature.

Here, when the temperature of the cooling water is higher than the target cooling temperature, wax 166 of the first actuator 140 expands, and urges the rod 152 in the arrow M1 direction, and urges the converting disc 156 in the arrow R1 direction. At this time, because the urging force from the first actuator 140 is greater than the urging force from the third actuator 170, the converting disc 156 rotates in the arrow R1 direction, and the valve member 118 rotates in the arrow B1 direction and is set at the opening position. As a result, the flow path sectional area of the bypass flow path 28 increases, and the amount of flow of the exhaust that flows to the second pipe 22 decreases. As a result, the effect of raising the temperature of the engine cooling water by the heat recovery apparatus 24 is suppressed.

In contrast, when the temperature of the cooling water is lower than the target cooling temperature, the wax 166 of the first actuator 140 contracts, and the urging force of the spring 162 in the arrow M2 direction is applied to the converting disc 156 as urging force in the arrow R2 direction. In this case, the converting disc 156 rotates in the arrow R2 direction due to the urging forces of the first actuator 140 and the third actuator 170, and rotates the valve member 18 in the arrow B2 direction and sets the valve member 18 at the closing position. As a result, the flow path sectional area of the bypass flow path 28 decreases, the amount of flow of the exhaust that flows to the second pipe 22 increases, and the effect of raising the temperature of the cooling water by the heat recovery apparatus 24 increases.

On the other hand, when the atmospheric temperature becomes less than or equal to 0° C., the wax 178, that is accommodated within the second housing 144 of the third actuator 170 that is exposed to atmospheric air (the atmosphere), contracts. As a result, the rod 152 is urged in the arrow M2 direction by the urging force of the spring 162 of the third actuator 170, and urges the converting disc 156 in the arrow R1 direction.

This urging force is greater than the urging force in the arrow R2 direction that the urging force of the spring 162 of the first actuator 140 applies to the converting disc 156. Therefore, the rod 152 of the first actuator 140 moves so as to follow the driving of the rod 152 of the third actuator 170.

As a result, the converting disc 156 rotates in the arrow R1 direction, and rotates the valve member 118 in the arrow B1 direction, and sets the valve member 118 at the opening position. As a result, the flow path sectional area of the bypass flow path 28 increases, and the amount of flow of the exhaust of the bypass flow path 28 increases. As a result, the amount of flow of the high-temperature exhaust toward the downstream side of the merging point of the first pipe 14 increases.

By the way, when, for example, the vehicle travels only a short distance in a geographic region where the outside temperature is low such as in a cold region or the like for example, exhaust flows further downstream than the merging point 26 of the first pipe 14 in a state in which the exhaust temperature is even lower, due to traveling of the vehicle stopping before the exhaust has sufficiently warmed-up or due to the exhaust being involved in heat exchange at the heat recovery apparatus 24. As a result, there are cases in which the moisture that is contained within the exhaust of the engine 12 collects as water in the vicinity of the lowest point 180 of the first pipe 14, and freezes (refer to frozen portion 186 in FIG. 4). In this case, the frozen portion 186 arises in front of the kick-up portion 182 of the lowest portion 180 of the first pipe 14, or the like, and there are cases in which the flow path sectional area of the first pipe 14 is decreased locally. In such cases, there is the concern that the performance of the engine 12 will deteriorate.

In contrast, at the exhaust heat recovery device 100, when the outside air temperature is less than or equal to 0° C., regardless of the temperature of the cooling water (the state of driving of the first actuator 140), due to the wax 178 of the third actuator 170 contracting, the rod 152 is moved in the arrow M2 direction by the urging force of the spring 162, and sets the valve member 18 at the opening position. Due thereto, the exhaust at the time of driving of the engine 12 flows to the downstream side of the first pipe 14 (the lowest portion 180, the kick-up portion 182, and the like), without the temperature dropping due to heat exchange by the heat recovery apparatus 24. As a result, at the downstream side of the first pipe 14, the frozen portion 186 can be melted, or an increase in or generation of the frozen portion 186 can be suppressed.

In this way, in the exhaust heat recovery device 100 relating to the present embodiment, the amount of flow of the high-temperature exhaust, that has not been involved in heat exchange at the heat recovery apparatus 24, can be increased at the downstream side of the first pipe 14 due to the valve member 18 being opened by the third actuator 170 regardless of the temperature of the cooling water in a case in which the outside air temperature at which there is the concern of freezing within the first pipe 14 becomes less than or equal to 0° C., and not only by opening and closing the valve member 18 on the basis of the temperature of the cooling water. Due thereto, freezing that arises at the lowest portion 180 or the kick-up portion 182 of the first pipe 14 can be prevented, and an increase in the frozen portion can be suppressed.

Further, because the exhaust heat recovery device 100 employs the combination of the first actuator 140 and the third actuator 170 that are non-controlled types, energization is not needed in order to control the opening and closing of the valve member 18, and power consumption can be reduced. As a result, the fuel efficiency of the vehicle can be improved.

Note that an intake negative pressure type actuator, that controls the opening and closing of the valve member 18 by negative pressure of the air supply side of the engine 12, can also be considered for use as the non-controlled type actuator.

Further, although the valve member 18 is provided at the bypass flow path 28 in the first and second embodiments, the present invention is not limited to the same provided that the valve member is set at a place at which it can increase and decrease the amount of flow of exhaust of the second pipe 22. For example, the valve member 18 may be provided at the second pipe 22.

What is claimed is:

1. An exhaust heat recovery device comprising:
a first pipe through which exhaust from an engine flows;
a second pipe that branches-off from the first pipe, and at which is disposed a heat recovery apparatus that carries out heat exchange with the exhaust and recovers exhaust heat;
a valve that adjusts an amount of flow of the exhaust that flows-in from the first pipe to the second pipe; and a plurality of actuators each individually capable of opening the valve, wherein the valve is opened by one of the plurality of actuators being actuated to open the valve even when at least one other of the plurality of actuators is not actuated to open the valve, wherein the plurality of actuators includes a first actuator that opens the valve on the basis of changes in temperature of a heat medium of the heat recovery apparatus, and a second actuator that opens the valve on the basis of changes in atmospheric temperature of the first pipe, and on the basis of changes in the atmospheric temperature of the first pipe, the second actuator opens the valve and reduces an amount of flow of the exhaust with respect to the second pipe, regardless of a state of opening of the first actuator.

2. The exhaust heat recovery device of claim 1,
wherein the plurality of actuators includes a third actuator that opens the valve by energization, and the third actuators opens the valve by energization and reduces an amount of flow of the exhaust with respect to the second pipe, regardless of states of opening of the other actuators.

3. The exhaust heat recovery device of claim 1, wherein at least one actuator among the plurality of actuators is actuated at different timings than others of the actuators.

4. The exhaust heat recovery device of claim 1, wherein, in a space of at least one of the plurality of actuators, wax is filled.

5. The exhaust heat recovery device of claim 4, wherein, in a space of each of the plurality of actuators, wax is filled.

* * * * *